Aug. 18, 1953          J. A. MEHM          2,649,077
PISTON ASSEMBLY FOR OSCILLATORY HYDRAULIC ACTUATORS
Filed July 30, 1951                                3 Sheets-Sheet 1

*INVENTOR.*
JOSEPH A. MEHM
BY
*William R. Lane*
ATTORNEY

Aug. 18, 1953 J. A. MEHM 2,649,077
PISTON ASSEMBLY FOR OSCILLATORY HYDRAULIC ACTUATORS
Filed July 30, 1951 3 Sheets-Sheet 2

*INVENTOR.*
JOSEPH A. MEHM
BY
*William R. Lane*
ATTORNEY

Aug. 18, 1953           J. A. MEHM           2,649,077

PISTON ASSEMBLY FOR OSCILLATORY HYDRAULIC ACTUATORS

Filed July 30, 1951           3 Sheets-Sheet 3

INVENTOR.
JOSEPH A. MEHM
BY

ATTORNEY

Patented Aug. 18, 1953

2,649,077

UNITED STATES PATENT OFFICE 2,649,077

PISTON ASSEMBLY FOR OSCILLATORY HYDRAULIC ACTUATORS

Joseph A. Mehm, Huntington Park, Calif., assignor to North American Aviation, Inc.

Application July 30, 1951, Serial No. 239,277

3 Claims. (Cl. 121—38)

This invention pertains to piston assembly for an hydraulically operated actuator, and has particular reference to one in which the pressure chamber is shaped like a sector or segment of a torus.

In the application of hydraulic actuators to the operation of elements requiring angular displacement or oscillatory motion in high performance aircraft and missiles, several problems arise and must be solved. This is especially true of the operation of control surfaces such as rudders, flaps, and ailerons. Among these problems are the following: In the very thin wings and control surfaces which are characteristic of high speed aircraft, space is not available for satisfactorily applying a conventional actuating mechanism which usually consists of a hinge, a bell crank, and an actuating cylinder. Moreover, the performance characteristics required of an hydraulic system, especially one controlled by an autopilot or servo system, will not tolerate the "slop" or lost motion inherent in a system having a number of joints or a considerable number of moving parts. Then, too, it is required that an actuator which is controlled by an autopilot or servo system be linear. That is to say, a given amount of hydraulic fluid applied at the actuator must produce the same amount of angular travel of the element in question (a rudder, for example) whether the element be at its mid-position or at the end of its travel.

It is therefore an object of this invention to provide an actuator which is extremely compact in a direction normal to its axis of rotation.

It is another object of this invention to combine all the elements required to produce oscillatory motion or angular displacement into one unit, the construction of which is such that a maximum of hydraulic and mechanical rigidity is attained.

It is a further object of this invention to provide an actuator such that when supplied a given amount of hydraulic fluid, substantially the same amount of angular travel will be produced regardless of the position of the actuator.

It is another object of this invention to provide sealing means whereby close relationship of the piston and body in an hydraulic actuator may be attained without holding extremely close manufacturing tolerances.

It is another object of this invention to provide a combination of hydraulic actuators adapted to produce twice the angular motion produced by a single actuator.

It is another object of this invention to provide an actuator having a minimum of working parts and a minimum of lost motion.

Other objects of invention will become apparent from the following description taken in connction with the accompanying drawings, in which, Fig. 1 is a plan view of the invention showing two opposing actuators in adjacent planes and having a common body;

Figure 1:
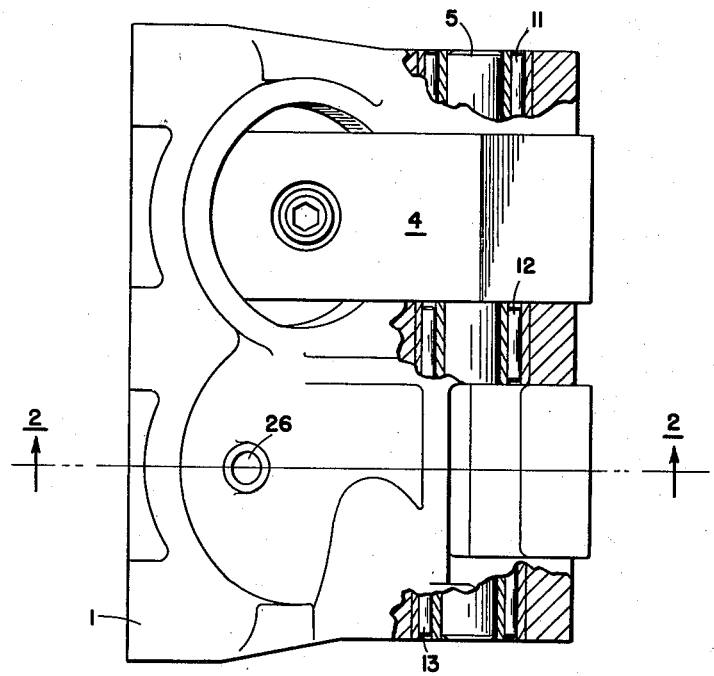
Figure 2:
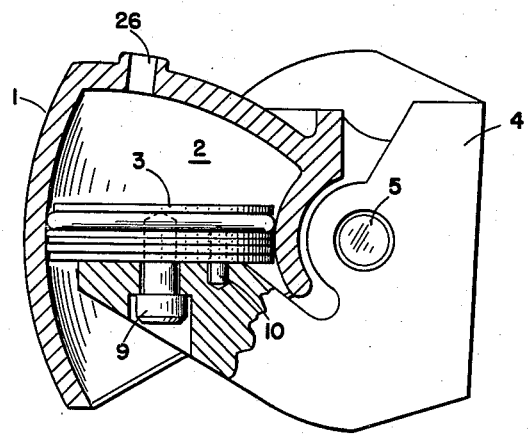
Fig. 2 is a sectional elevational view of the invention taken at 2—2 in Fig. 1.
Figure 3:
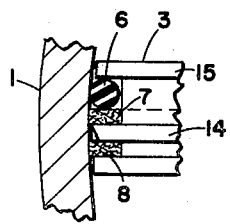
Fig. 3 is an enlarged sectional view of the invention showing adaptation of the piston to the cylinder wall in Fig. 2.

Referring to Figs. 1, 2, and 3, there is shown a body 1 in which the pressure chamber 2, Fig. 2, is a segment of a torus, a piston 3 which fits into the torus-shaped pressure chamber of body 1, an arm 4 which carries piston 3 and is pivotally mounted to body 1 at a point which is the center of curvature of the torus, a shaft 5 which allows arm 4 to rotate about that point of the body which coincides with the center of curvature of the torus, and an O ring 6 which seals piston 3 to the torus-shaped pressure chamber of body 1. A back-up ring 7 prevents the extrusion of O ring 6 at higher pressures, and a wiper ring 8 wipes foreign material from the pressure chamber and distributes oil which leaks past O ring 6 to lubricate the pressure chamber. Screw 9 attaches piston 3 to arm 4, and a dowel pin 10 prevents piston 3 from rotating about screw 9. Roller bearings 11, 12, and 13 provide an antifriction bearing for shaft 5 in body 1.

Piston 3 is provided with an O ring groove consisting of an intermediate flange 14 and an inner flange 15. Intermediate flange 14 is tapered, as shown exaggerated in Fig. 3, to provide the necessary close fit at the inner surface thereof and at the same time to provide a small clearance between it and the curved bore in body 1. Inner flange 15 is of a smaller diameter than flange 14. Since inner flange 15 serves only to keep the O ring in its groove, it need not fit close to the bore in body 1. A seal in the outward direction is all that is required because the pressure is always directed outward, whether produced by forcing fluid into chamber 2 or by forcing fluid out of the chamber by rotation of the arm. The close fit of intermediate flange 14 cooperates with O ring 6 to produce the desired seal for the pressure chamber when piston 3 is either stationary or moving.

Screw 9 and dowel 10 are provided with diametral clearance with respect to their respective holes in arm 4. The length of the shank of screw 9 is very slightly greater than the length of the hole in arm 4. Thus piston 3 is allowed to "float," i. e., to seek the center of the bore in body 1. This allows much greater tolerances in the machining of body 1 and arm 4. If desired, the "floating" feature may be utilized for assembly only, and may be eliminated for operation of the device by placing a washer under the head of screw 9.

A better fit to the curved bore in body 1 can be achieved by machining one diameter, say the top portion of flange 14 (which is radially positioned within the toroidal chamber), to a close fit and concentric within the cylinder and machining the remaining flanges in a general fit to the toroidal chamber whereby they are thus positioned somewhat eccentrically. Hence piston 3 must not be allowed to rotate after being properly assembled in the bore of body 1. Dowel pin 10 serves this purpose, and, in addition, holds piston 3 stationary while screw 9 is tightened. Hydraulic fluid under pressure is supplied to port 26 and to a corresponding port (not shown) on the other actuator shown in Fig. 1. Since the two actuators are arranged in opposing relationship, motion in either rotational direction may be produced. The two arms are tied together by being attached to a rigid structure.

Figure 4:
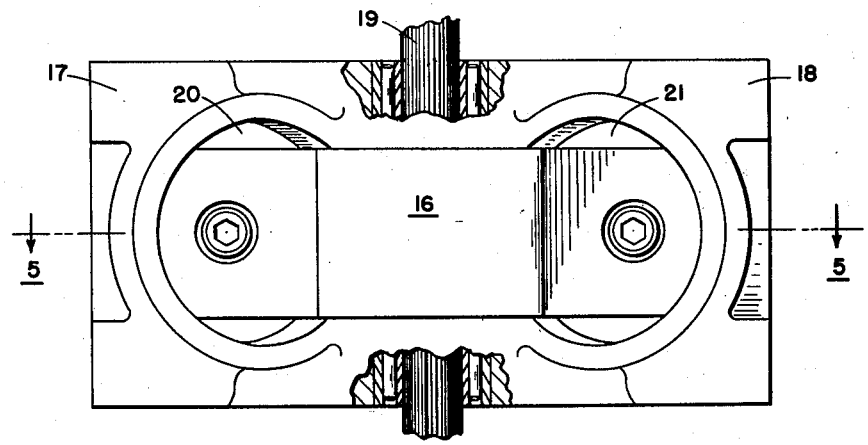
Fig. 4 is a plan view of a second embodiment of the invention.

Referring now to Fig. 4, there are shown two actuators similar to those of Fig. 1, having a common arm 16 and bodies 17 and 18 arranged in the same plane but in opposing relationship. In this embodiment of the invention attachment of the aircraft control surface or the aircraft frame may be made to arm 16 or to shaft 19 by extending it out one or both sides of the body and by serrating or otherwise securing it to the arm. Pistons 20 and 21, and their associated seals and attachments to arm 16, are identical to piston 3 shown in Figs. 1, 2, and 3 and its associated parts. Likewise, pressure chambers 22 and 23 are identical to pressure chamber 2 of Fig. 2.

Figure 5:
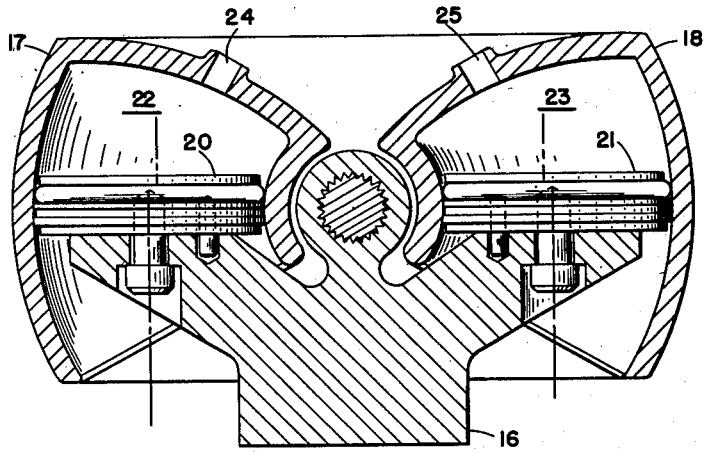
Fig. 5 is a sectional view of the device shown in Fig. 4 taken at 5—5 in Fig. 4.

The device shown in Figs. 4 and 5 is capable of supplying torque in either direction by controlling the amount of hydraulic fluid supplied to chambers 22 and 23 via ports 24 and 25.

Figure 6:
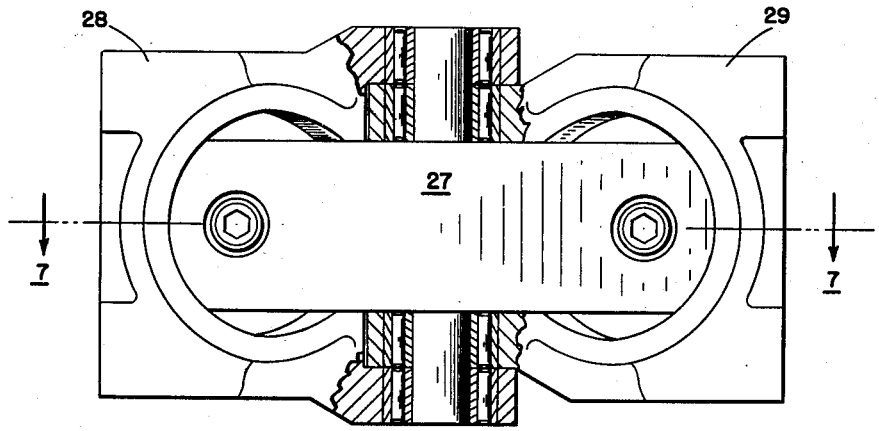
Fig. 6 is a plan view of a third embodiment of the invention.
Figure 7:
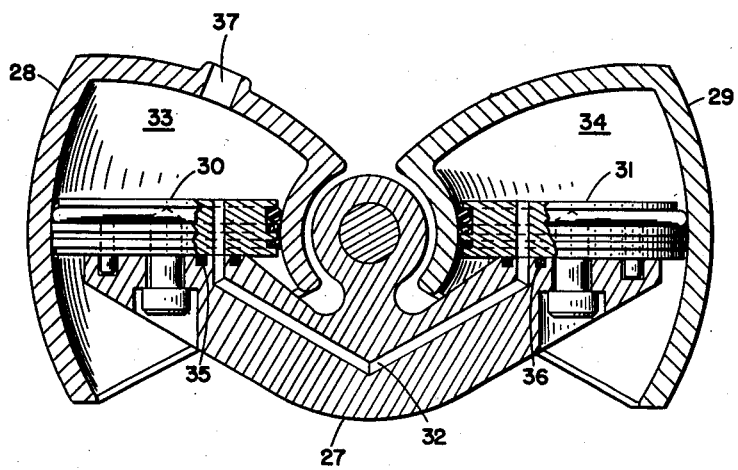
Fig. 7 is a sectional view of the device shown in Fig. 6 taken at 7—7 in Fig. 6.

Referring now to Fig. 6, two actuator bodies 28 and 29 and a common arm 27 are shown, with the bodies arranged in the same plane but in opposing relationship. The common arm 27 and pistons 30 and 31 (Fig. 7) incorporate oil passage 32 which extends from pressure chamber 33 to pressure chamber 34. Pistons 30 and 31 and arm 27 are sealed with respect to oil passage 32 by O rings 35 and 36. Attachment of bodies 28 and 29 is made to a control surface and to the aircraft structure, respectively. Arm 27 merely floats and is unattached to other structure. This arrangement provides twice the angular travel of a single actuator and may be used where space is not available for a single actuator having twice the angular travel. Except as noted above, the pistons, bearings, and seals shown in Figs. 6 and 7 are identical to their counterparts shown in Figs. 1, 2, and 3.

Hydraulic fluid is supplied under pressure to port 37 whence it is communicated to chambers 33 and 34. If body 28 is attached to an aircraft wing, body 29 may be attached to an aileron. Body 29 then traverses an angle twice that traversed by piston 30 with respect to body 28. Location of port 37 may be varied, but it must enter the pressure chamber at some point not swept over by the O ring. The method of mounting bodies 28 and 29 to the aircraft structure and control surfaces has not been shown, as it may be made to suit any particular application by bolts or other conventional attachment means.

It should be observed that while the actuators herein described include a hinge which is not a part of conventional actuators, each still has essentially only one moving part. In use, the body of the actuator is mounted rigidly to the fixed element, and the arm or the other body is fastened rigidly to the moving element. A typical example of the use of the invention is in the operation of an aileron on a wing.

The use of a toroidal pressure chamber provides an actuator which has a strictly linear travel characteristic, and the use of a simple piston with a "floating" type mount greatly facilitates the manufacture of the unit.

From the foregoing it will be seen that this invention provides a rotary hydraulic actuator of great simplicity, compactness, and rigidity, being linear in operating characteristic and capable of a wide variety of uses.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In an hydraulic actuator for producing oscillatory motion having a pressure chamber shaped like a portion of a torus, a piston within said chamber having a circumferential O ring groove of rectangular cross-section, an inner flange concentric with said O ring groove, an outer flange eccentric with said O ring groove said flange being tapered from the inner face thereof to the outer face thereof, and a wiper ring groove of rectangular cross-section concentric with said O ring groove, an O ring which cooperates with said O ring groove in said piston to seal said torus-shaped pressure chamber in said body, a back-up ring fitted with said O ring in said O ring groove to prevent extrusion of said O ring at high pressures, a wiper ring within said wiper ring groove to keep foreign material out of said pressure chamber and to distribute lubricant in said pressure chamber, a screw to attach said arm to said piston, and a dowel to prevent said piston from rotating about said screw to thereby cause said arm to rotate with respect to said body when fluid under pressure is applied to said pressure chamber.

2. An hydraulic actuator comprising a pressure chamber shaped like a portion of a torus, a piston within said chamber having a tapped centered hole and an off-center hole therethrough, an arm having holes to match the holes in said piston to be actuated by said piston, a screw fitted to said centered holes and smaller in diameter than the hole in said arm and longer than the hole in said arm, and a dowel fitted to said off-center holes to prevent rotation of said piston with respect to said screw to thereby permit said piston to be self-positioning within said chamber in the plane of said piston.

3. Piston means comprising a piston body, a circumferential O ring groove of rectangular cross-section, an inner flange concentric with said O ring groove, an outer flange eccentric with said O ring groove said flange being tapered from the inner face thereof to the outer face thereof, a wiper ring groove of rectangular cross-section concentric with said O ring groove, an O ring which cooperates with said O ring groove in said piston to afford a pressure seal, a back-up ring fitted with said O ring in said rectangular O ring groove to prevent extrusion of said O ring at high pressures, a wiper ring within said wiper ring groove to clear foreign material and distribute lubricant, a center hole tapped into said piston body whereby said center hole is concentric with respect to one flange and eccentric with respect to the remaining flanges, an off-center hole, an arm having holes to match the holes in said piston body, a screw fitted to said centered hole and smaller in diameter than the hole in said arm and longer than the hole in said arm, and a dowel fitted to said off-center hole to prevent rotation of said piston with respect to said arm to thereby permit said piston body to be self-positioning within a chamber.

JOSEPH A. MEHM.

References Cited in the file of this patent

UNITED STATES PATENTS

| Number | Name | Date |
| --- | --- | --- |
| 280,974 | Venner | July 10, 1883 |
| 1,076,120 | Hobbs | Oct. 21, 1913 |
| 1,250,569 | Desmond | Dec. 18, 1917 |
| 1,577,579 | Hirschler | Mar. 23, 1926 |
| 1,799,298 | Jakob | Apr. 7, 1931 |
| 2,286,452 | Worth | June 16, 1942 |

FOREIGN PATENTS

| Number | Country | Date |
| --- | --- | --- |
| 3,595 | Great Britain | of 1901 |